Figure 1:
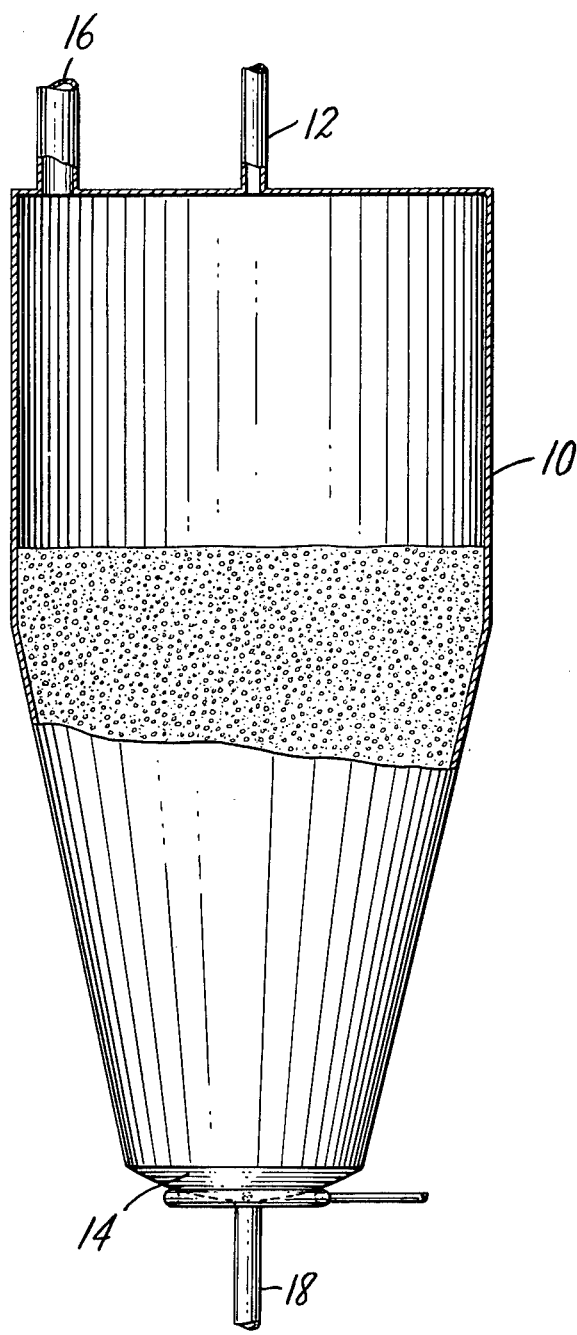

United States Patent [19]

Kongsgaarden

[11] 4,126,424
[45] Nov. 21, 1978

[54] METHOD OF COMPACTING SILICA DUST

[75] Inventor: Ole A. Kongsgaarden, Vagsbygd, Norway

[73] Assignee: Elkem-Spigerverket A/S, Oslo, Norway

[21] Appl. No.: 791,604

[22] Filed: Apr. 27, 1977

[30] Foreign Application Priority Data

Apr. 27, 1976 [NO] Norway .................................. 761435

[51] Int. Cl.² .......................... B01J 2/16; C01B 33/12
[52] U.S. Cl. ............................. 23/293 R; 23/313 AS; 23/313 FB
[58] Field of Search ........ 23/313 AS, 313 R, 313 FB, 23/293 R, 293 A; 423/336, 337, 335; 252/317; 264/117

[56] References Cited

U.S. PATENT DOCUMENTS

| | | | |
|---|---|---|---|
| 2,511,088 | 6/1950 | Whaley | 23/313 FB |
| 2,689,973 | 9/1954 | Lee | 23/313 FB |
| 3,532,473 | 10/1970 | Biegler | 23/313 AS |
| 3,560,151 | 2/1971 | Vogt | 427/337 |
| 3,645,684 | 2/1972 | Cuir | 423/336 |
| 3,832,434 | 8/1974 | Flood | 264/117 |
| 4,053,375 | 10/1977 | Roberts | 23/313 FB |

Primary Examiner—Stephen J. Emery
Attorney, Agent, or Firm—Eyre, Mann, Lucas & Just

[57] ABSTRACT

A method of compacting silica dust without the use of water is disclosed. The dust is charged to a hopper and is then injected with air under pressure whereby the weight per unit volume of the material is increased.

3 Claims, 1 Drawing Figure

METHOD OF COMPACTING SILICA DUST

The present invention relates to silica dust and more particularly to a method of compacting the silica dust.

In the production of materials having a high silicon content such as silicon, ferrosilicon, silicon carbide and other silicon-containing alloys in smelting furnaces, there is generated a great deal of silicon monoxide which is converted to silicon dioxide. The silicon dioxide is in a very fine form and it is normally referred to as colloidal silica.

Because of the very light nature of this dust, it does not remain in the smelting process but rather is carried up with the off gasses from the smelting process into the furnace flue. Because escaping dust would be an environmental pollutant, it is necessary that the dust be recovered from the smoke from the smelting furnace. Typical dry methods employed in this regard involve bag house filters and the like.

The very fine dust recovered which has a typical weight by volume of 150-200 kg/m$^3$ must then be disposed of. Various utilities for these dusts are known such as in refractory ceramics, as a filler in building materials and rubber and as an anti-caking material for fertilizers. When the material is used in these particular applications, it is, of course, usually necessary to transport it to the end user. Because the colloidal silica dust is so light and powdery, transportation costs are inordinately high.

There have in the past been methods for increasing the bulk density of the silica by the addition of water. One such treatment is disclosed in U.S. Pat. No. 3,832,434. While this method is very effective, there are instances where the addition of water is detrimental. For example, there are applications where water will interfere with the particular application and the nodules must therefore be dried before they can be used, an additional process step which is undesirable both in terms of economics and energy considerations. Furthermore, when colloidal silica dust is combined with water to increase its bulk density, the very fine colloidal silica dust assumes a different form and it has been found to be virtually impossible to return the material to its original colloidal silica state, a state which is beneficial in a number of applications.

In accordance with the present invention, there is disclosed a method of compacting silica dust and thereby increasing the weight per unit volume of the material without the need for water. The silica dust is charged to a hopper and is then injected with pressurized air. The air is preferably of sufficient force to fluidize the silica dust in the hopper and maintain it in a agitated state. When the treatment with air has been completed, it is found that the bulk density of the material has increased by a factor of up to 300%.

An apparatus suitable for the present invention is shown in FIG. 1 of the drawings. Silica dust is charged to a covered hopper 10, suitably of circular configuration, through an inlet pipe 12. The dimensions of the hopper are not at all critical except that the bottom cone should be sufficiently steep to ensure agitation of the entire volume, not only the central part. Silica dust is preferably at least half of the volume of the hopper. Air is injected into the hopper through a fluidizing bottom 14 of known design, and exhausted through an air outlet 16. The amount of air used will, of course, depend upon the diameter of the hopper. In general it has been found that into hoppers with 2m diameter preferably at least about 7 N m$^3$/min (normal cubic meters per minute) should be used. The minimum time of treatment should be at least about 5 hours and it is preferable that the time of treatment be greater than 10 hours. In continuous operation of industrial units, a mean residence time of 24 hours or more may be favourable. When the treatment has been completed, the materials are suitably removed through discharge tube 18. 18. If the operation is continuous, both charging and discharging take of course place all the time.

In one specific example, a colloidal silica dust having a bulk density of about 170 kg/m$^3$ was treated in accordance with the present invention. The dust was charged to a covered hopper having a diameter of 400 cm, equipped with a fluidized bottom of 200 cm diameter. The height was about 810 cm, 450 cm referring to the conical part and 360 cm to the cylindrical part. The silica dust charged to the hopper filled the hopper to a height of about 200 cm. from the top, in continuous operation. Air was supplied at a rate of about 7 N m$^3$/min and dust charged at a rate of about 600 kg/h. This flow rate is sufficient to fluidize the silica dust in this particular container. After stabilazation of the conditions, it was found that the bulk density of the material had been increased to about 500 kg/m$^3$, an increase in bulk density of approximately 300%.

It will be understood that the claims are intended to cover all changes and modifications of the preferred embodiment of the invention, herein chosen for the purpose of illustration, which do not constitute departure from the spirit and scope of the invention.

What is claimed is:

1. A reversible waterless process for increasing the bulk density of that colloidal silica dust recovered from metallurgical smelting processes producing materials high in silicon content which comprises charging the recovered colloidal silica dust to an enclosed space and injecting pressurized air from below into the colloidal silica dust at a flow rate that causes fluidization for a period of at least about five hours in a batch process.

2. A reversible waterless process for increasing the bulk density of that colloidal silica dust recovered from metallurgical smelting processes producing materials high in silicon content which comprises charging the recovered colloidal silica dust to an enclosed space and injecting pressurized air from below into the colloidal silica dust at a flow rate that causes fluidization in a continuous process with a mean residence time of said silica dust into said enclosed space of at least about five hours.

3. The process of claim 2 wherein the mean residence time is at least about 10 hours.